June 11, 1963  C. F. WEINREICH  3,093,482
BUTTER MAKING METHOD

Filed Aug. 24, 1959  3 Sheets-Sheet 1

INVENTOR.
CHARLES F. WEINREICH
ATTORNEY

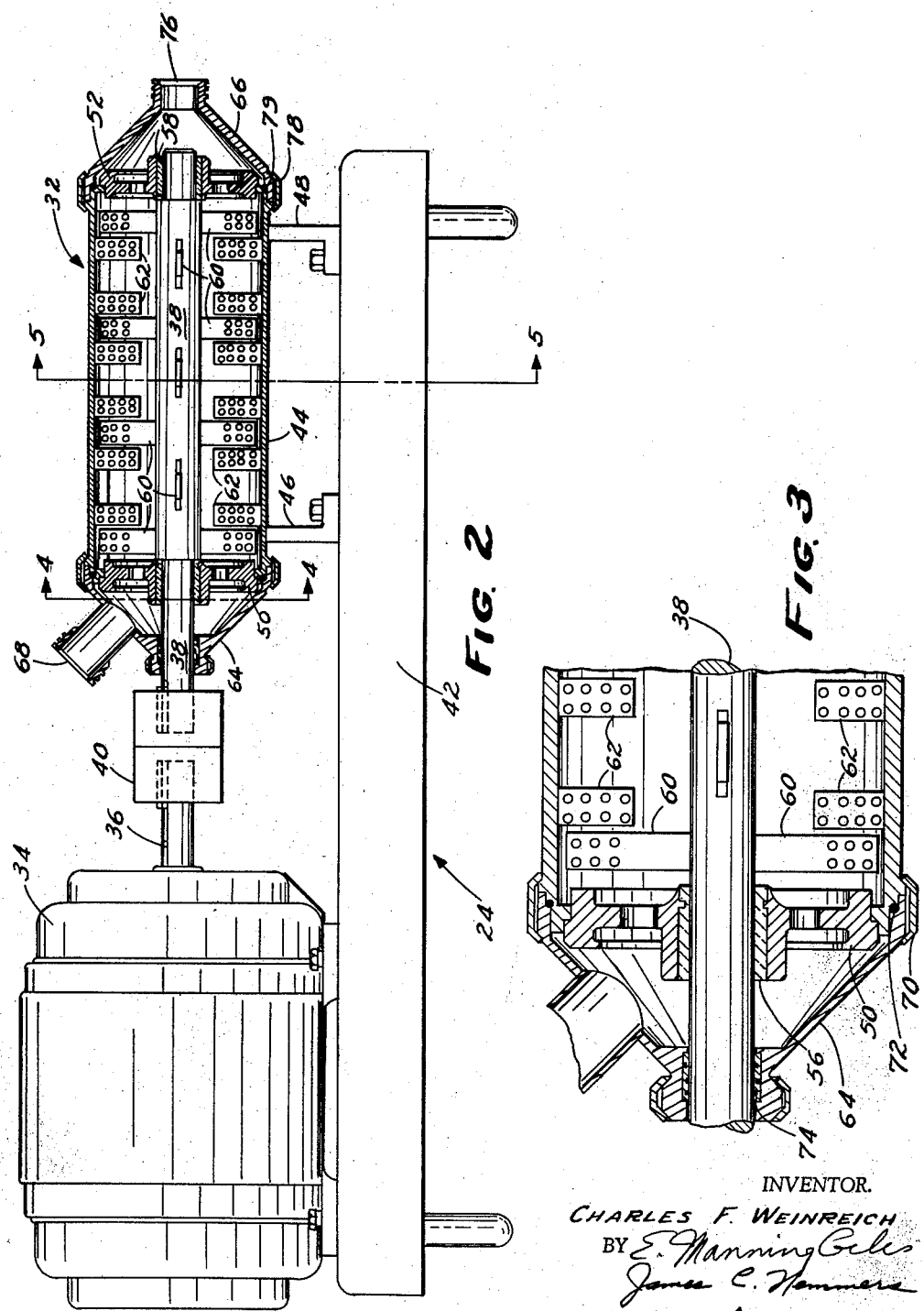
INVENTOR.
CHARLES F. WEINREICH

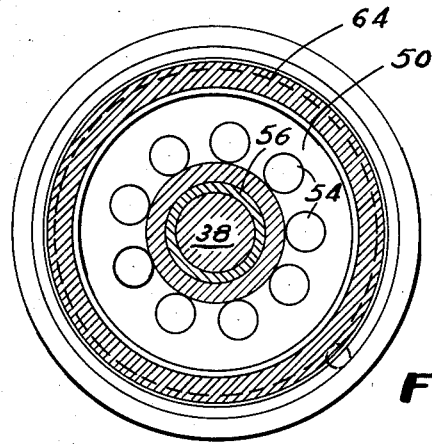
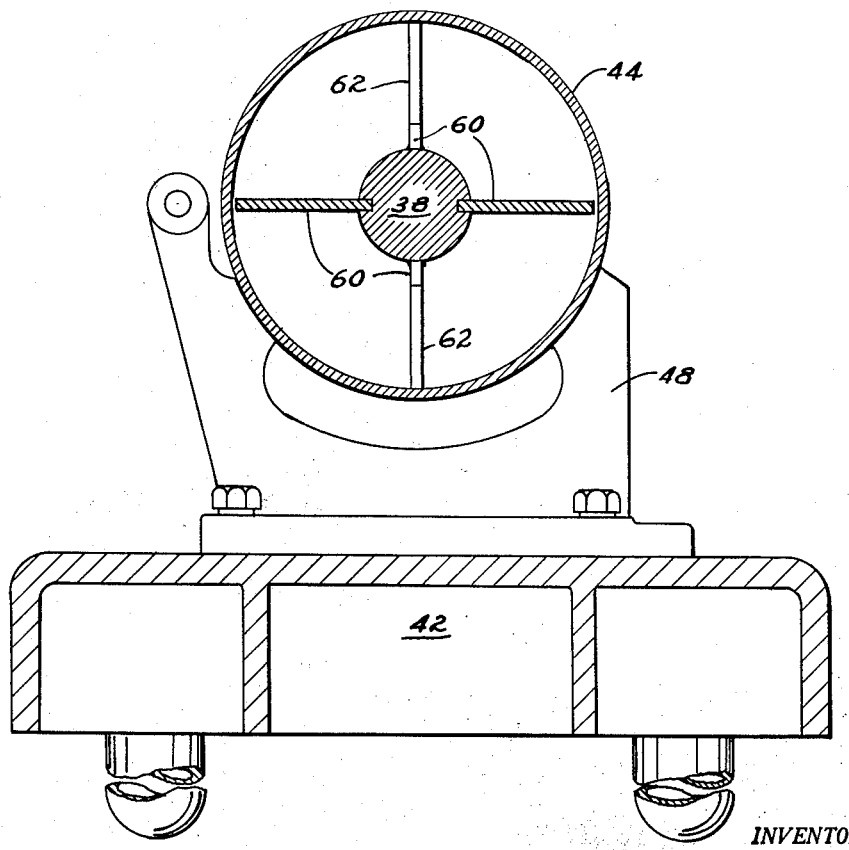

United States Patent Office 3,093,482
Patented June 11, 1963

3,093,482
BUTTER MAKING METHOD
Charles F. Weinreich, Cedar Rapids, Iowa, assignor to Cherry-Burrell Corporation, Cedar Rapids, Iowa, a corporation of Delaware
Filed Aug. 24, 1959, Ser. No. 835,623
4 Claims. (Cl. 99—119)

This invention relates to a method of making butter and more particularly, to an improved process of producing butter by the batch method in churns. The invention further relates to apparatus for carrying out this new process.

The largest percentage of butter sold commercially today is made by the batch method in churns. In the batch method, a predetermined quantity of cooled, pasteurized cream is placed in a churn and agitated by rotating the churn. After the churn has been rotated for a period of time, the fat globules of the cream tend to adhere to each other. Continued rotation of the churn tends to form larger and larger groups of fat globules until finally, they coalesce and form small granules of butter. These butter granules are then "worked" until they merge together to form a solid mass of butter.

In the conventional batch operation, the average time required for churning the cream to form butter granules is approximately 45 minutes. This time period may be even longer for so-called "difficult" creams resulting in increased cost of labor and power.

Many factors affect the churning time and among them is the temperature of the cream supplied to the churn. By increasing this temperature several degrees above the otherwise "proper" temperature, the amount of liquid fat in proportion to the solidified fat is increased and the fat globules clump or cluster more readily, thereby shortening the churning time. However, this warming of the cream also increases the proportion of the smaller fat globules which escape clustering, thereby increasing the percentage of fat lost to the buttermilk.

Cooling the cream a few degrees below the "proper" temperature will minimize the fat lost to the buttermilk and produce a firmer butter, but the lower temperature delays the granule forming process and the breaking of the cream. In such a case the churning process often requires more than an hour. As a result of the warming of the cream caused by the increased heat of friction from this extended time, some of the benefits of cooler churning temperatures are lost.

The "proper" cream temperature for efficient churning depends upon several conditions, including the fat composition, the characteristics of the churn itself, and the length of time the cream is held at the churning temperature just prior to churning. For most cream, the "proper" temperature is somewhere in the range of 36–65° F.

It is possible by "prechurning" or destabilizing cream in accordance with the invention described herein to reduce greatly the time previously required to churn most cream while at the same time producing a colder, firmer butter with a minimum of fat loss. I have found that after "prechurning," butter granules start forming in the churn in 3 to 10 minutes whereas it formerly required 40 to 60 minutes to reach the granule stage in the conventional batch operation.

It is therefore a principal object of this invention to reduce substantially the amount of churning time required to produce a high quality butter by the batch method.

It is another object of the invention to provide an improved batch process for the manufacture of a colder, firmer butter that is, therefore, considerably easier to handle.

Concurrently with the above objects, it is still a further object of the invention to appreciably shorten the churning time while minimizing the fat losses in the butter making process.

These and other objects of the invention will be readily apparent from a consideration of the following detailed description wherein reference is made to the accompanying drawings in which:

FIGURE 2 is a longitudinal sectional view of the destabilizer unit that forms a part of the system of FIGURE 1;

FIGURE 3 is an enlarged portion of the sectional view of FIGURE 2, showing the impeller blades and one end of the destabilizer in detail;

Figure 6:
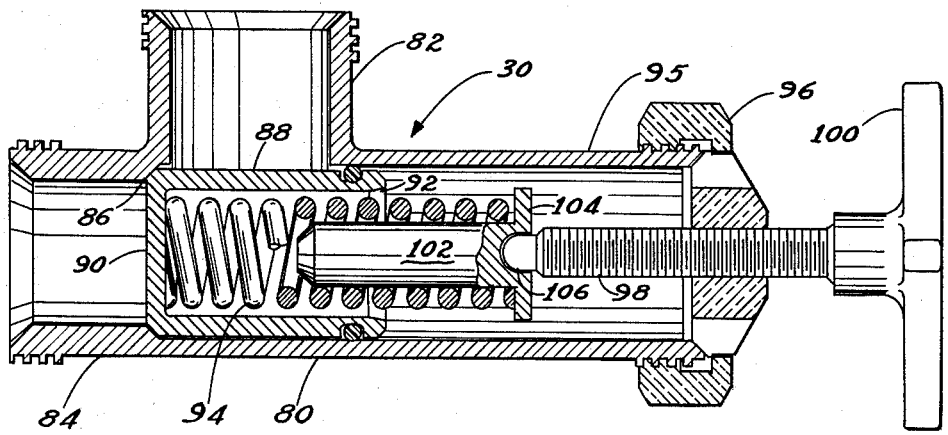

FIGURES 4 and 5 are sectional views taken on the lines 4—4 and 5—5 of FIGURE 2; and FIGURE 6 is a sectional view of the hold back valve used with the destabilizer unit.

Figure 1:
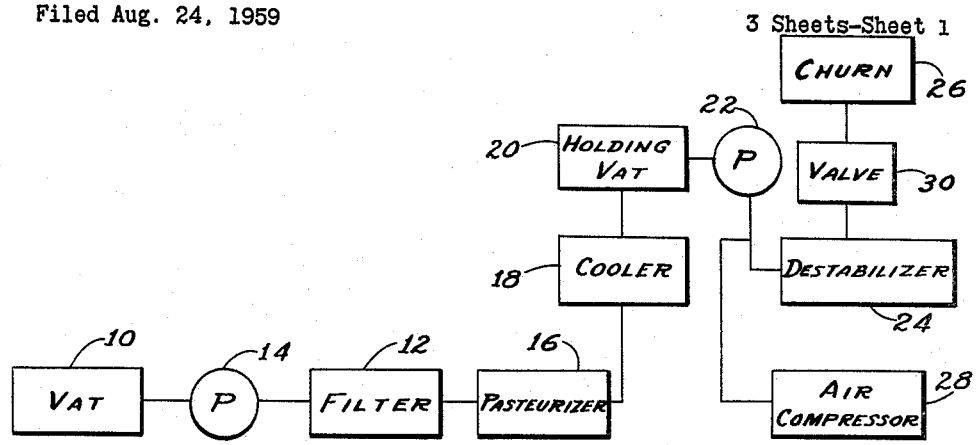
FIGURE 1 is a diagrammatic view showing a buttermaking system embodying my invention.

Referring now to the drawings, particularly to FIGURE 1, raw cream is received and stored in vat 10 and may be pumped through a filter 12 by pump 14 to remove impurities. The cream is then pasteurized by any well-known method, such as the vat-holding, steam injection, or high-temperature short-time methods, by processing in suitable apparatus indicated by reference numeral 16. After the cream is pasteurized, it is cooled by appropriate means 18 and passed into vat 20 where the cream is held for a sufficient length of time to assure proper fat solidification. A positive-type pump 22 thereafter feeds the cream to destabilizer unit 24 in which it is violently agitated. The cream preferably is supplied to the destabilizer at a temperature in the range of 36° to 65° F. Destabilized cream from unit 24 is then churned in churn 26 where after a short time, it is converted into butter and is ready for packaging.

Since the presence of air or inert gas is essential for the efficient destabilization of cream, I prefer to supply air to the system at some point in the duct work interconnecting pump 22 and the destabilizer 24. The air may be added to the cream above atmospheric pressure by means of a compressor 28. Although the place of adding the air is not critical, I prefer to intermix the cream and air prior to the time the cream enters the destabilizer 24 to facilitate better control of the cream-air ratio. In some cream, particularly sour cream, the amount of air needed to obtain good destabilization is low, and often entrained air and carbon dioxide is present in the cream in sufficient amounts that no additional air is necessary. On the other hand, relatively large quantities of gas or air may materially help in promoting the destabilization of the more "difficult" creams.

In order to retard the flow of the cream through the destabilizer 24, there is provided adjacent the outlet thereof a hold-back valve indicated generally by the reference numeral 30. This valve is shown in FIGURE 6 and is described in detail hereinafter.

Referring now to FIGURES 2, 3, 4 and 5, the destabilizer 24 is comprised of an agitating unit 32 which is powered by an electric motor 34 of any suitable type and construction. The drive-shaft 36 of the motor 34 is connected to the shaft 38 of the agitating unit 32 at their adjacent ends by means of a coupling 40. The motor 34 and agitating unit 32 are mounted together on a suitable base 42.

The agitating unit 32 consists of a hollow, cylindrical main body portion 44 which is supported at each end on the base 42 by suitable structure, such as legs 46 and 48. An end plate 50 is secured to the inlet end of the main body portion 44 and a similar plate 52 is secured to the outlet end. Plates 50 and 52 each have a plurality of holes 54 (FIGURE 4) equally distributed around its circumference. Bearings 56 and 58 are mounted in the centers of plates 50 and 52, respectively, to support the rotatable shaft 38. Secured to shaft 38 are a plurality of perforated impeller blades 60, and mounted on the interior of the body 44 closely adjacent to each blade 60 is a pair of perforated stator blades 62. When rotating, the impeller blades 60 violently agitate the cream as it passes through the unit 32 and because of their position relative to the stator blades 62, the agitation intensity is high.

Completing the destabilizing unit 24 are an inlet end cover 64 and an outlet end cover 66. Inlet cover 64 is of substantially conical shape with an externally threaded inlet fitting 68 extending therefrom. Cover 64 is fitted to the main body portion 44 in a flanged joint and is secured thereto by means of suitable clamping means 70. An O-ring seal 72 prevents cream from leaking through the joint and a seal 74 at the apex portion of the cover 64 prevents the cream from leaking along the shaft 38. The outlet cover 66 is also of substantially conical shape with a threaded opening 76 formed at the apex. Similar to inlet cover 64, the outlet cover 66 is fitted to the main body portion 44 in a flanged joint, secured thereto by suitable clamping means 78, and sealed with an O-ring 79.

From the structure thus far described, it is readily apparent that the cream enters inlet duct 68, passes through the holes 54 of end plate 50 into the interior of the main body portion 44, where it is violently agitated by the impeller blades 60. The agitating unit 32 is relatively free from pumping action, movement of the cream from the inlet to the outlet end being accomplished by the pressure generated by pump 22.

While it is possible to change the intensity of agitation in the destabilizer 24 by varying the speed of the motor 34, I prefer to maintain the speed constant and obtain the desired degree of clustering or destabilization by regulating the duration of the agitation, the cream-air ratio, the temperature of the cream, and the back pressure produced by the hold-back valve 30. All of these factors are interrelated and may be varied to suit the particular operating conditions. I prefer to regulate these variables so that they produce an agitation intensity sufficient to cluster at least 50 percent of the fat globules in the cream prior to churning.

In FIGURE 6, a preferred construction of the hold-back valve 30 is shown in detail. This valve consists of a substantially cylindrical main body portion 80 with an outlet fitting 82 formed perpendicular thereto. The end 84 of the main body portion nearest the outlet fittings is externally threaded for connection to the outlet of the destabilizer 24. Inside the main body 80 and near the threaded end 84 there is formed a bevel which provides a seat 86. Slidable within the cylindrical main body portion and normally resting on the seat 86 is a piston member 88. The piston member is closed at one end 90 and open at the other end 92 in which there is received a helical spring 94. At the end 95 of the main body 80 opposite the threaded end 84, there is secured a cap 96 through the center of which there is threaded a screw member 98 having a suitable handle 100. Engaged with the screw member 98 and received inside the convolutions of spring 94 is an insert member 102 having a flange 104 on one end thereof. To prevent disengagement of the screw member 98 and the insert 102, the end of screw member 98 is fitted in a centrally disposed depression 106 in the insert 102. The insert helps to stiffen the spring 94 and relative movement therebetween in one direction is prevented by the flange 104. Thus, by turning the handle 100 and advancing the screw number 98, the tension in the spring 94 can be increased to regulate the amount of pressure required to move the piston in the cylinder and thereby control the flow from the outlet 82.

I prefer to make the components of my system of stainless steel for sanitary reasons. Likewise, it will be noted that the components of the system and of the destabilizer itself are designed for convenient disassembly to permit ease of cleaning.

With the method and apparatus I have described above, the cream is agitated thoroughly thus minimizing greatly the failure of some of the fat globules to cluster, which often occurs to an undesirable extent in the conventional batch method. Also, my invention makes it both possible and practical to regulate the intensity of the agitation to obtain the proper degree of clustering of the fat globules prior to churning.

It will be understood, however, that while I have shown and described my invention in a preferred form, that various modifications can be made in the invention by those skilled in the art without departing from the scope and spirit of the invention. It is therefore my invention that any such revisions and variations of the invention will be included within the scope of the following claims.

I claim:

1. A process for manufacturing butter comprising the steps of: pasteurizing cream; cooling said pasteurized cream; violently agitating said cream in the presence of gas sufficiently to cause rapid destabilization of said cream; and churning said destabilized cream to form butter.

2. A process for manufacturing butter comprising the steps of: pasteurizing cream; cooling the pasteurized cream to a temperature in the range of 36° to 65° F.; violently agitating said cream in the presence of gas sufficiently to cause rapid destabilization of said cream; and churning said destabilized cream to form butter.

3. A process for manufacturing butter comprising the steps of: pasteurizing cream; cooling the pasteurized cream to a temperature in the range of 36° to 65° F.; mixing air with said cream; violently agitating said cream and air sufficiently to cause rapid clustering of at least 50 percent of the fat globules in said cream; and churning said cream to form butter.

4. A process for manufacturing butter comprising the steps of: pasteurizing cream; cooling pasteurized cream to a temperature in the range of 36° to 65° F.; violently agitating said cream in the presence of gas and above atmospheric pressure at an intensity sufficient to cause rapid destabilization of said cream; and churning said destabilized cream to form butter.

References Cited in the file of this patent

UNITED STATES PATENTS

| | | |
|---|---|---|
| 1,925,787 | Brooks | Sept. 5, 1933 |
| 2,370,978 | McLean | Mar. 6, 1945 |
| 2,406,819 | Farrall | Sept. 3, 1946 |
| 2,514,254 | Paulus | July 4, 1950 |
| 2,536,297 | Lundal | Jan. 2, 1951 |

OTHER REFERENCES

"Buttermaking: Old and New," Canadian Food Industries, September 1947, pages 16–21.